(12) United States Patent
Yokokawa et al.

(10) Patent No.: US 9,210,017 B2
(45) Date of Patent: Dec. 8, 2015

(54) RECEPTION DEVICE, RECEPTION METHOD, AND PROGRAM

(71) Applicant: Sony Corporation, Tokyo (JP)

(72) Inventors: Takashi Yokokawa, Kanagawa (JP); Hiroyuki Kamata, Kanagawa (JP); Hidetoshi Kawauchi, Kanagawa (JP); Yuken Goto, Tokyo (JP); Kenichi Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/402,332

(22) PCT Filed: May 22, 2013

(86) PCT No.: PCT/JP2013/064223
§ 371 (c)(1),
(2) Date: Nov. 20, 2014

(87) PCT Pub. No.: WO2013/179973
PCT Pub. Date: Dec. 5, 2013

(65) Prior Publication Data
US 2015/0085910 A1    Mar. 26, 2015

(30) Foreign Application Priority Data

May 31, 2012    (JP) .................................. 2012-123876

(51) Int. Cl.
*H04L 27/00* (2006.01)
*H04B 7/005* (2006.01)
*H04B 7/06* (2006.01)
*H04J 11/00* (2006.01)
*H04L 27/01* (2006.01)
*H04L 27/26* (2006.01)

(52) U.S. Cl.
CPC ............ *H04L 27/0008* (2013.01); *H04B 7/005* (2013.01); *H04B 7/06* (2013.01); *H04J 11/00* (2013.01); *H04L 27/01* (2013.01); *H04L 27/2649* (2013.01)

(58) Field of Classification Search
CPC . H04L 27/01; H04L 27/2649; H04L 27/0008; H04B 7/0871
USPC ................... 375/229, 232, 260, 316, 340, 347
See application file for complete search history.

(56) References Cited

U.S. PATENT DOCUMENTS

| | | | |
|---|---|---|---|
| 2005/0243780 A1* | 11/2005 | Trainin et al. ................. | 370/338 |
| 2008/0075147 A1* | 3/2008 | Grossman et al. ............ | 375/136 |
| 2012/0327879 A1* | 12/2012 | Stadelmeier et al. ......... | 370/329 |

* cited by examiner

*Primary Examiner* — Leon Flores
(74) *Attorney, Agent, or Firm* — Dentons US LLP

(57) ABSTRACT

There is provided a reception device including a reception unit configured to receive an OFDM (Orthogonal Frequency Division Multiplexing) signal, an acquisition unit configured to acquire a transmission parameter concerning the OFDM signal contained in the OFDM signal, and a selection unit configured to select a demodulation mode of the OFDM signal in accordance with the acquired transmission parameter.

9 Claims, 15 Drawing Sheets

| TRANSMISSION PARAMETER | | | | |
|---|---|---|---|---|
| SISO/MISO | FEF PRESENCE/ABSENCE | PP | FRAME LENGTH | OTHERS |

| DEMODULATION MODE | | | | | | |
|---|---|---|---|---|---|---|
| EQUALIZATION MODE | | | NOISE ESTIMATION MODE | | | OTHERS |
| INTERPOLATION TYPE | FREQUENCY DIRECTION INTERPOLATION TYPE | OTHERS | PILOT ESTIMATION | FIXED VALUE | OTHERS | |

FIG. 4

| TRANSMISSION PARAMETER | | | | |
|---|---|---|---|---|
| SISO/ MISO | FEF PRESENCE/ ABSENCE | P P | FRAME LENGTH | OTHERS |

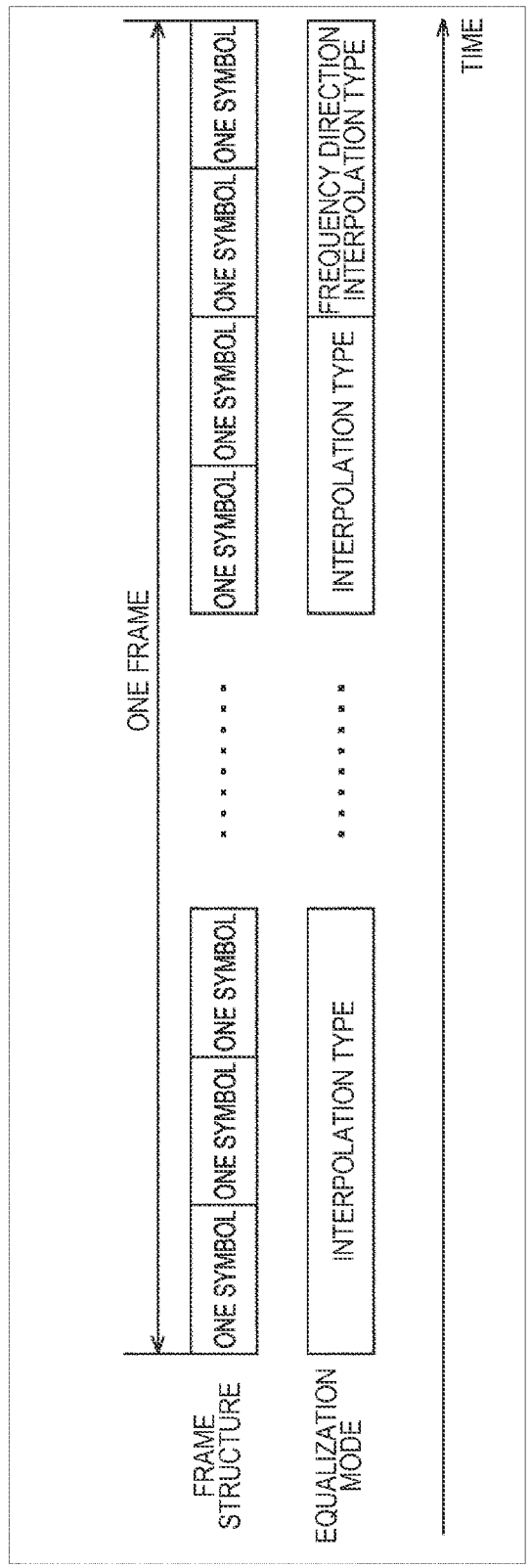

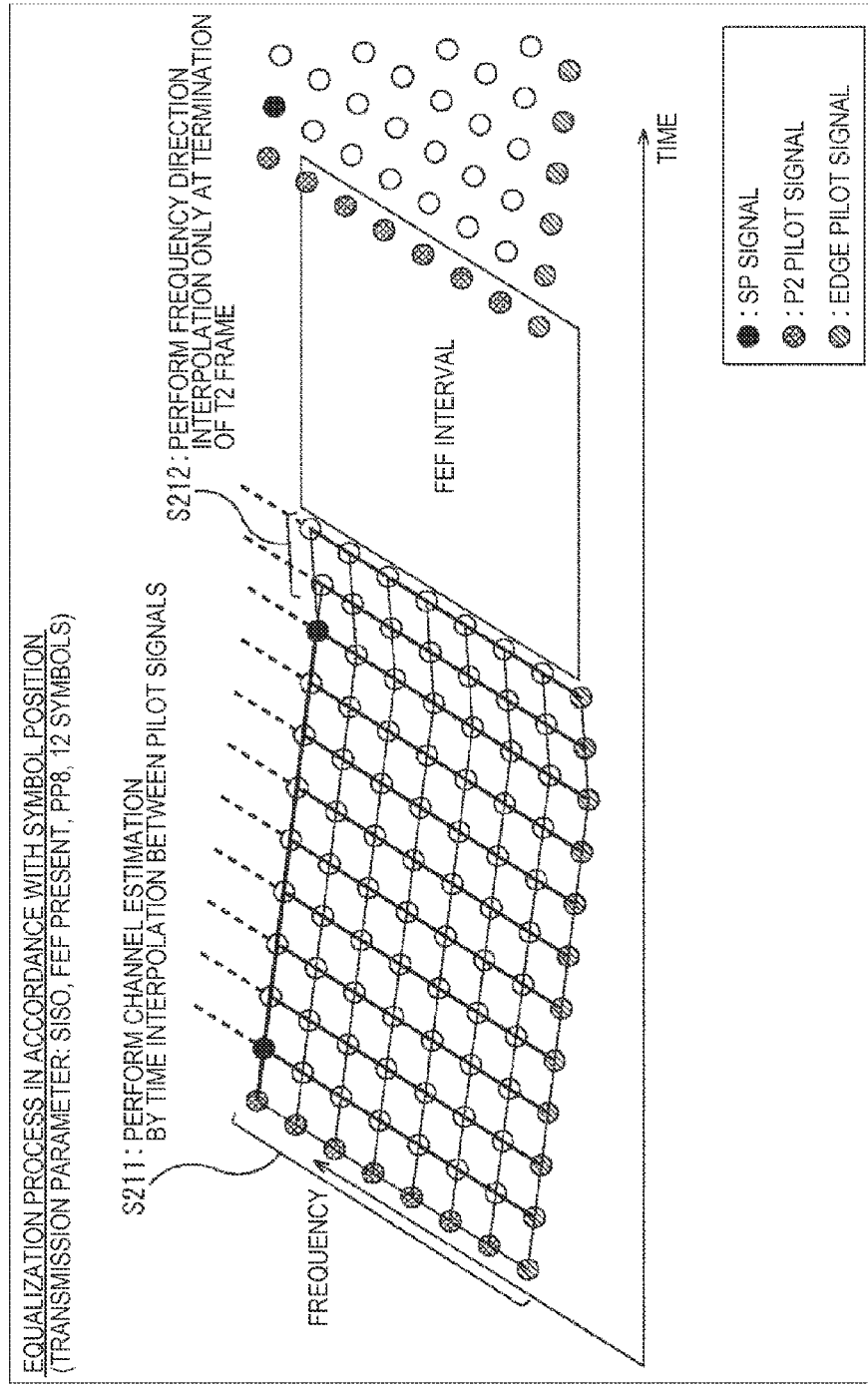

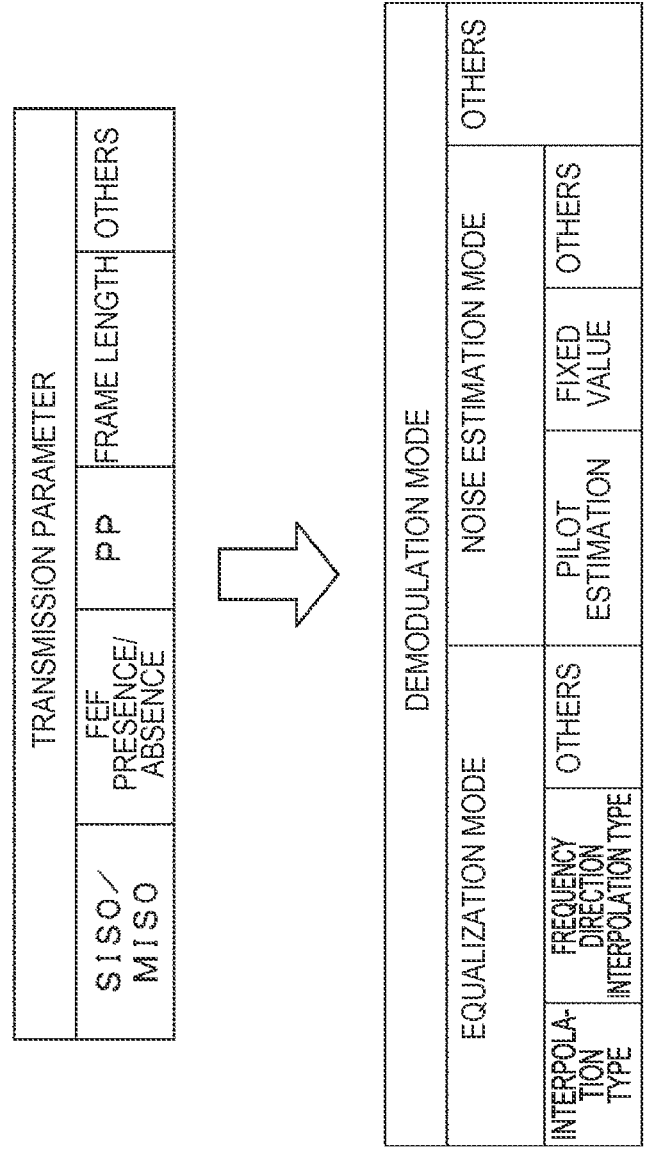

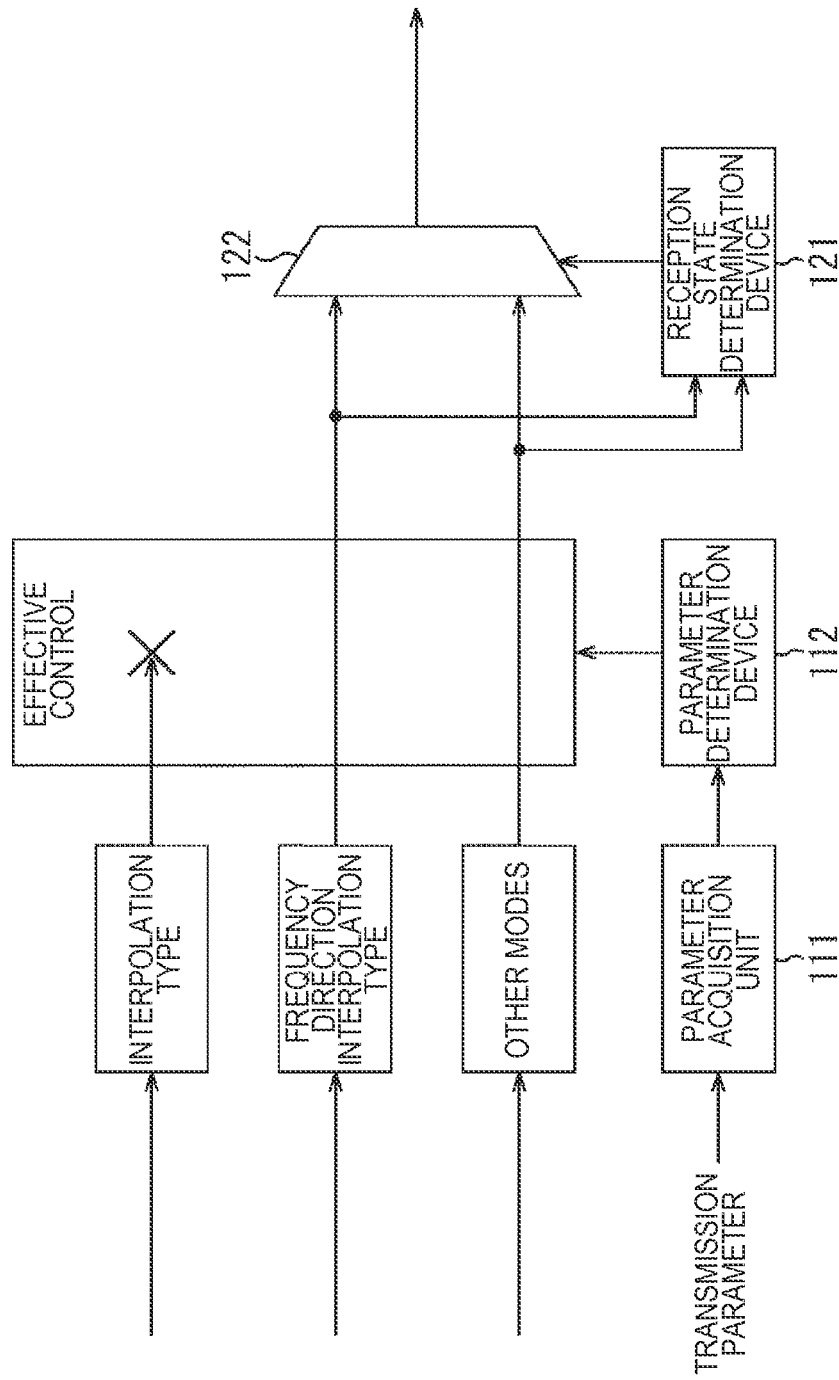

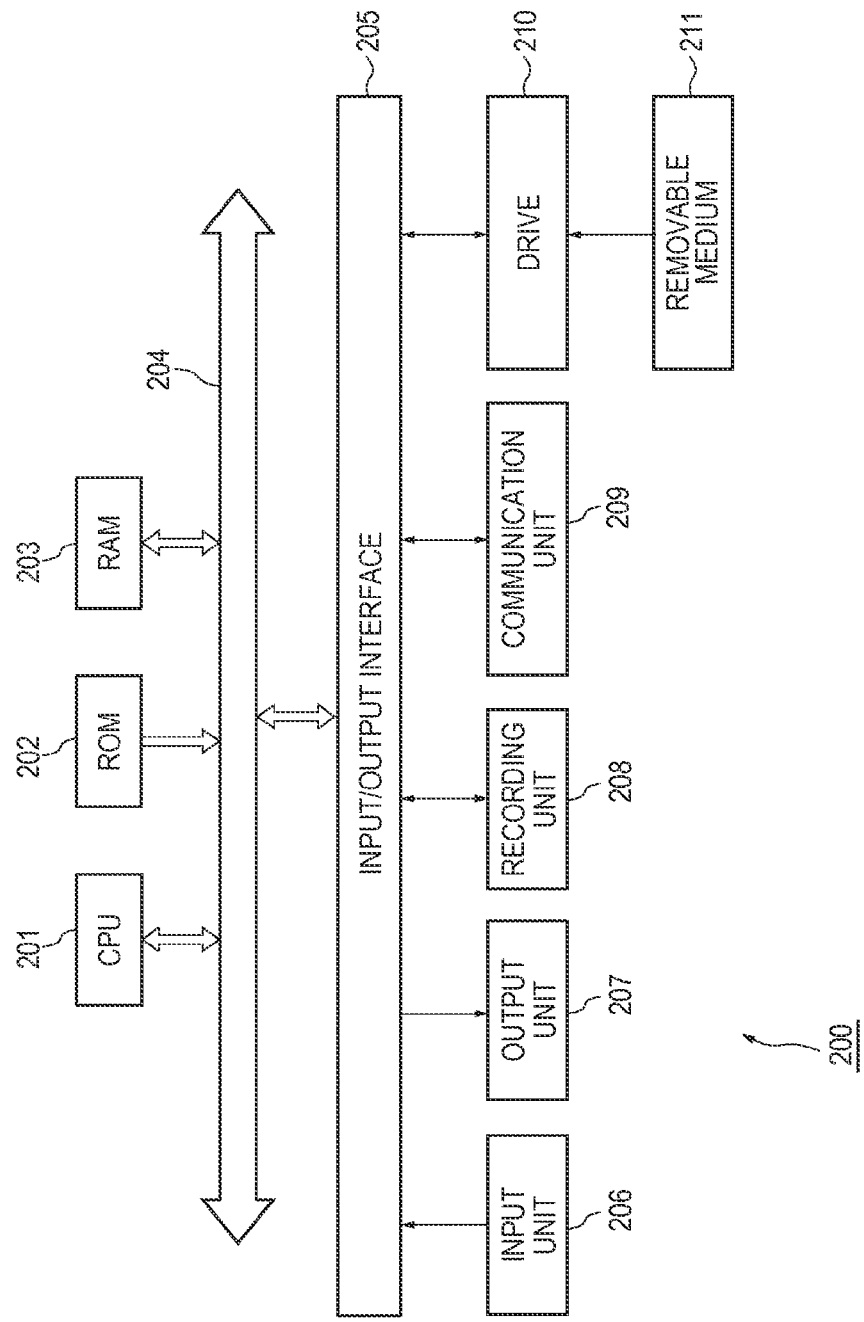

RECEPTION DEVICE, RECEPTION METHOD, AND PROGRAM

TECHNICAL FIELD

The present disclosure relates to a reception device, a reception method, and a program, and in particular, relates to a reception device enabled to perform a demodulation process in an appropriate mode, a reception method, and a program.

BACKGROUND ART

In recent years, a modulation mode called the orthogonal frequency division multiplexing (OFDM) mode is used as a mode of transmitting a digital signal. The OFDM mode is a mode in which many orthogonal subcarriers are prepared in a transmission band, data is allocated to the amplitude and the phase of each of these subcarriers, and phase shift keying (PSK) or quadrature amplitude modulation (QAM) is applied for digital modulation.

The OFDM mode is frequently applied to digital terrestrial broadcasting considerably affected by multi-path interference. Digital terrestrial broadcasting adopting the OFDM mode includes standards like, for example, digital video broadcasting-terrestrial (DVB-T) and integrated services digital broadcasting-terrestrial (ISDB-T).

In addition, digital video broadcasting (DVB)-T.2 is established by European telecommunication standard institute (ETSI) as a standard of next-generation digital terrestrial broadcasting (see, for example, Non-Patent Literature 1).

In a reception device conforming to the DVB-T2 standard, a demodulation process such as an equalization process, a noise estimation process or the like is performed when a received OFDM signal is demodulated. As the mode of the equalization process, for example, the interpolation type mode, the frequency direction interpolation type mode, and other equalization modes are known.

In a conventional reception device, as shown in FIG. 1, the equalization process of the interpolation type mode, the frequency direction interpolation type mode, or other equalization modes is performed and a reception state thereof is determined by a reception state determination device 11. Then, the equalization mode in accordance with the determination result by the reception state determination device 11 is selected by a selector 12.

CITATION LIST

Non-Patent Literature

Non-Patent Literature 1: DVB BlueBook A133, Frame structure channel coding and modulation for a second generation digital terrestrial television broadcasting system (DVB-T2), DVB's home page, [searched on May 15, 2012], The Internet <URL:http://www.dvb.org/technology/standards>

SUMMARY OF INVENTION

Technical Problem

In a conventional reception device, as described above, reception states of the demodulation process in different demodulation modes are monitored and the demodulation mode in accordance with monitoring results is selected. However, when a more appropriate demodulation mode is not selected due to a determination delay or an erroneous determination by the reception state determination device 11, performance of demodulation is degraded.

The present technology is developed in view of the above circumstances and the demodulation process in appropriate demodulation mode is enabled.

Solution to Problem

A reception device according to an aspect of the present technology includes a reception unit configured to receive an OFDM (Orthogonal Frequency Division Multiplexing) signal, an acquisition unit configured to acquire a transmission parameter concerning the OFDM signal contained in the OFDM signal, and a selection unit configured to select a demodulation mode of the OFDM signal in accordance with the acquired transmission parameter.

The transmission parameter contains at least a first parameter indicating that a communication mode is SISO (Single Input Single Output) or MISO (Multiple Input Single Output), a second parameter indicating presence/absence of a second frame having a different structure from a first frame as a unit of transmitting data in a predetermined standard, a third parameter indicating an arrangement of pilot signals, or a fourth parameter indicating a frame length of the first frame. The selection unit selects the demodulation mode in accordance with each parameter or a combination of the parameters.

The selection unit selects an equalization mode as the demodulation mode.

The equalization mode is an interpolation type mode in which frequency direction interpolation of a channel estimate estimated by time interpolation between the pilot signals is performed or a frequency direction interpolation type mode in which interpolation is performed only in a frequency direction. The selection unit selects the frequency direction interpolation type mode when the second parameter indicates that the second frame is present.

The selection unit selects a noise estimation mode as the demodulation mode.

The noise estimation mode is a pilot estimation mode in which the pilot signals are used or a fixed value mode in which a pre-defined fixed value is used. The selection unit selects the fixed value mode when the second parameter indicates that the second frame is present and the frame length indicated by the fourth parameter is equal to or less than a predetermined threshold.

The selection unit selects the demodulation mode in accordance with a symbol position defined by the transmission parameter.

The selection unit selects an equalization mode as the demodulation mode.

The equalization mode is an interpolation type mode in which frequency direction interpolation of a channel estimate estimated by time interpolation between the pilot signals is performed or a frequency direction interpolation type mode in which interpolation is performed only in a frequency direction. The selection unit selects the interpolation type mode for the symbol position other than at a termination of the first frame and selects the frequency direction interpolation type mode for the symbol position at the termination of the first frame.

The selection unit selects a noise estimation mode as the demodulation mode.

The reception device may be an independent device or an internal block constituting one device.

A reception method and a program in an aspect of the present technology are a reception method and a program corresponding to a reception device in an aspect of the present technology.

In a reception device, a reception method, and a program according to an aspect of the present technology, an OFDM signal is received, a transmission parameter concerning the OFDM signal contained in the OFDM signal is acquired, and a demodulation mode of the OFDM signal is selected in accordance with the acquired transmission parameter.

Advantageous Effects of Invention

According to an aspect of the present technology, a demodulation process can be performed in appropriate demodulation mode.

BRIEF DESCRIPTION OF DRAWINGS

FIG. 4 is a diagram showing an example of a transmission parameter.

FIG. 11 is a diagram illustrating the selection method of the equalization mode in accordance with a symbol position of the present technology.

FIG. 12 is a diagram showing a concrete example of an equalization process in accordance with the symbol position.

FIG. 13 is a diagram showing an example of the demodulation mode.

FIG. 14 is a diagram illustrating another example of the selection method of the equalization mode.

FIG. 15 is a diagram showing a configuration example of a computer.

DESCRIPTION OF EMBODIMENTS

An embodiment of the present technology will be described below with reference to the drawings.

[Configuration of the Reception Device]

Figure 1:
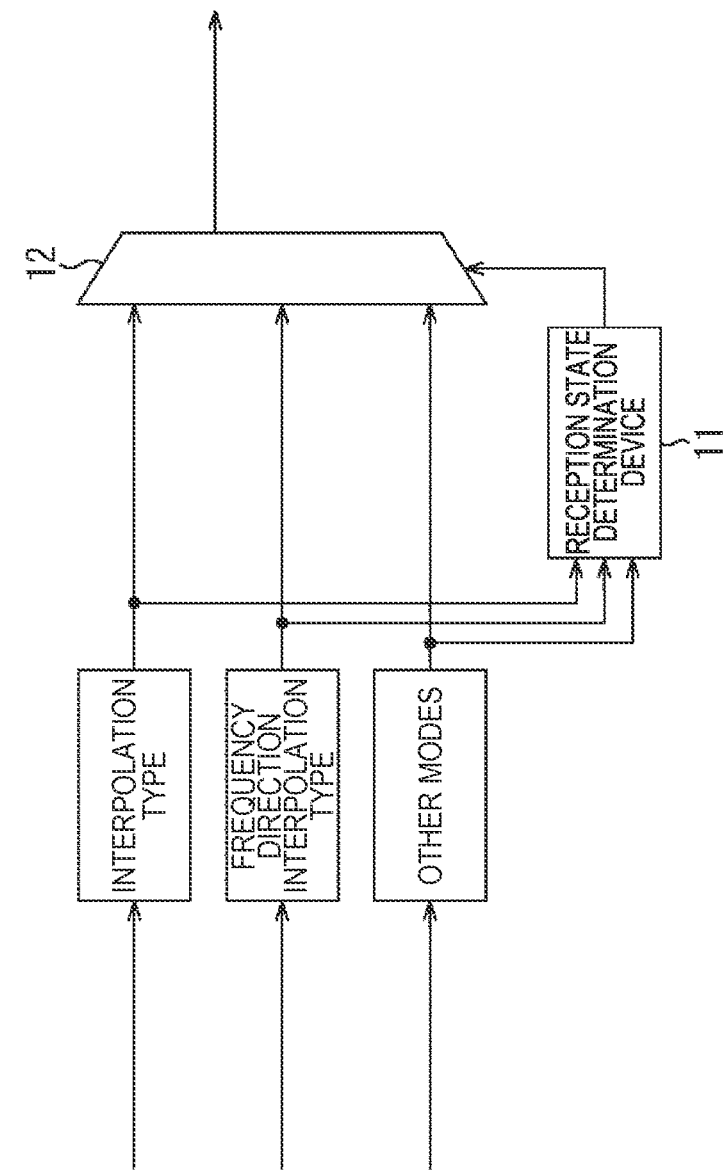
FIG. 1 is a diagram illustrating a conventional selection of a demodulation mode.
Figure 2:
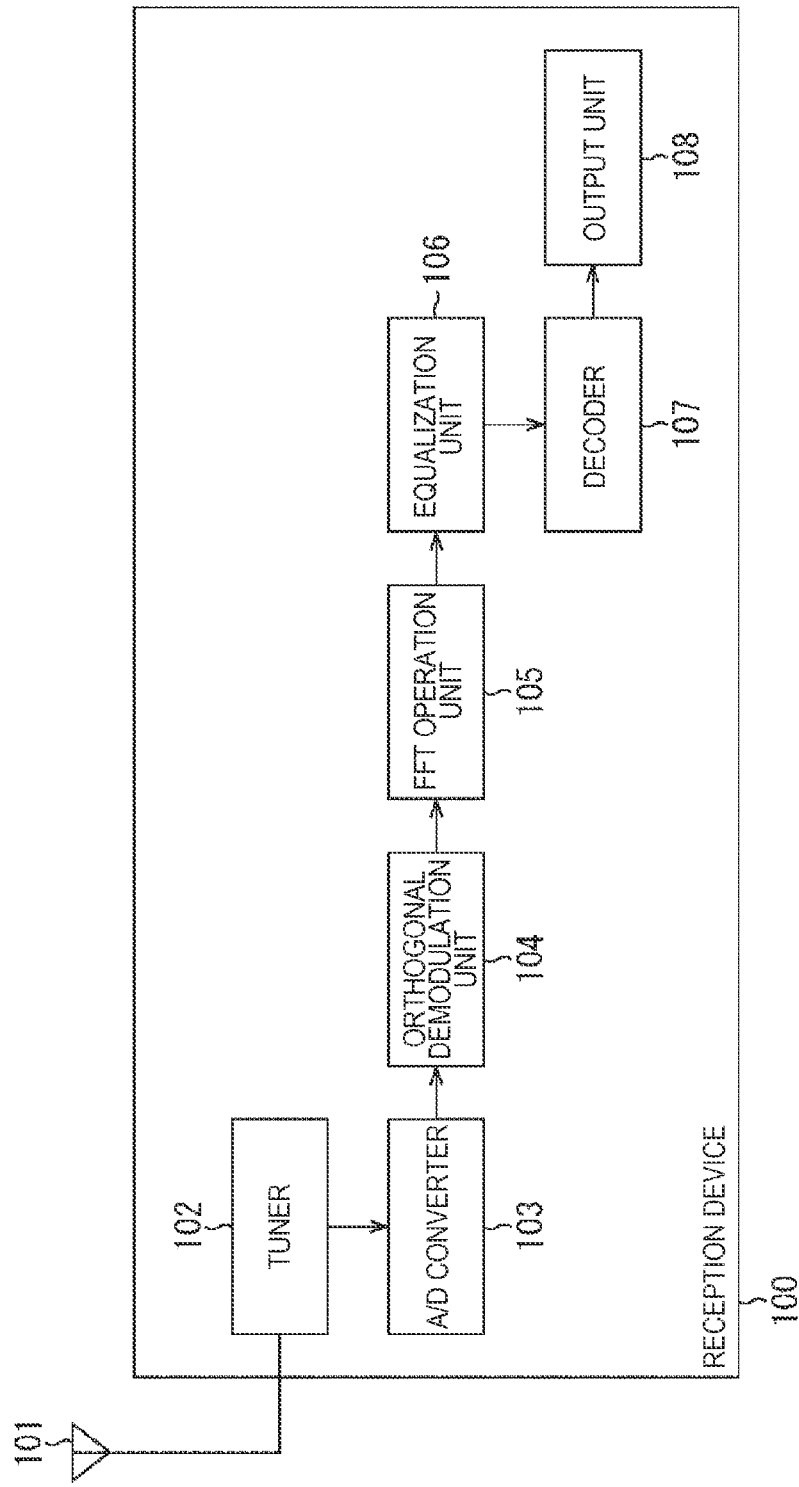
FIG. 2 is a diagram showing the configuration of an embodiment of a reception device to which the present technology is applied.

FIG. 2 is a diagram showing the configuration of an embodiment of a reception device to which the present technology is applied.

A reception device 100 is a receiver conforming to the DVB-T2 standard. The reception device 100 includes an antenna 101, a tuner 102, an A/D converter 103, an orthogonal demodulation unit 104, an FFT operation unit 105, an equalization unit 106, a decoder 107, and an output unit 108.

The antenna 101 receives an OFDM signal transmitted from a transmitter installed in a broadcasting station or the like via a transmission line and supplies the OFDM signal to the tuner 102. The tuner 102 performs processing such as frequency conversion on the OFDM signal received by the antenna 101 and supplies the processed OFDM signal to the A/D converter 103.

The A/D converter 103 amplifies or attenuates the gain of the OFDM signal supplied from the tuner 102 and also performs an A/D (Analog/Digital) conversion process on the OFDM signal to convert the OFDM signal from an analog signal into a digital signal. The A/D converter 103 supplies the OFDM signal converted into a digital signal to the orthogonal demodulation unit 104.

The orthogonal demodulation unit 104 performs orthogonal demodulation of the OFDM signal supplied from the A/D converter 103 using a carrier signal of a predetermined frequency and supplies the OFDM signal as a baseband signal obtained thereby to the FFT operation unit 105.

The FFT operation unit 105 performs a fast fourier transform (FFT) on the OFDM signal supplied from the orthogonal demodulation unit 104 and supplies the transformed OFDM signal to the equalization unit 106.

The equalization unit 106 corrects distortion of the OFDM signal supplied from the FFT operation unit 105. More specifically, the equalization unit 106 equalizes the OFDM signal by compensating for distortion caused by the transmission line such that the OFDM signal from the FFT operation unit 105 is a signal that should be received, that is, the OFDM signal is as close to the OFDM signal immediately after transmitted from the transmitter as possible.

The OFDM signal equalized by the equalization unit 106 is restored as data by a demapping process being performed thereon and is supplied to the decoder 107 as demodulated data.

The decoder 107 performs, for example, moving picture experts group (MPEG) decoding of encoded data supplied from the equalization unit 106 and supplies video or audio data obtained as a result to the output unit 108.

The output unit 108 outputs video or audio data supplied from the decoder 107.

The reception device 100 is configured as described above.

[Selection Method of the Equalization Mode]

As the equalization mode of the equalization process performed by the equalization unit 106, the interpolation type mode, the frequency direction interpolation type mode, and other equalization modes are available. The equalization unit 106 selects one of these equalization modes and performs the equalization process in accordance with the selected equalization mode.

Figure 3:
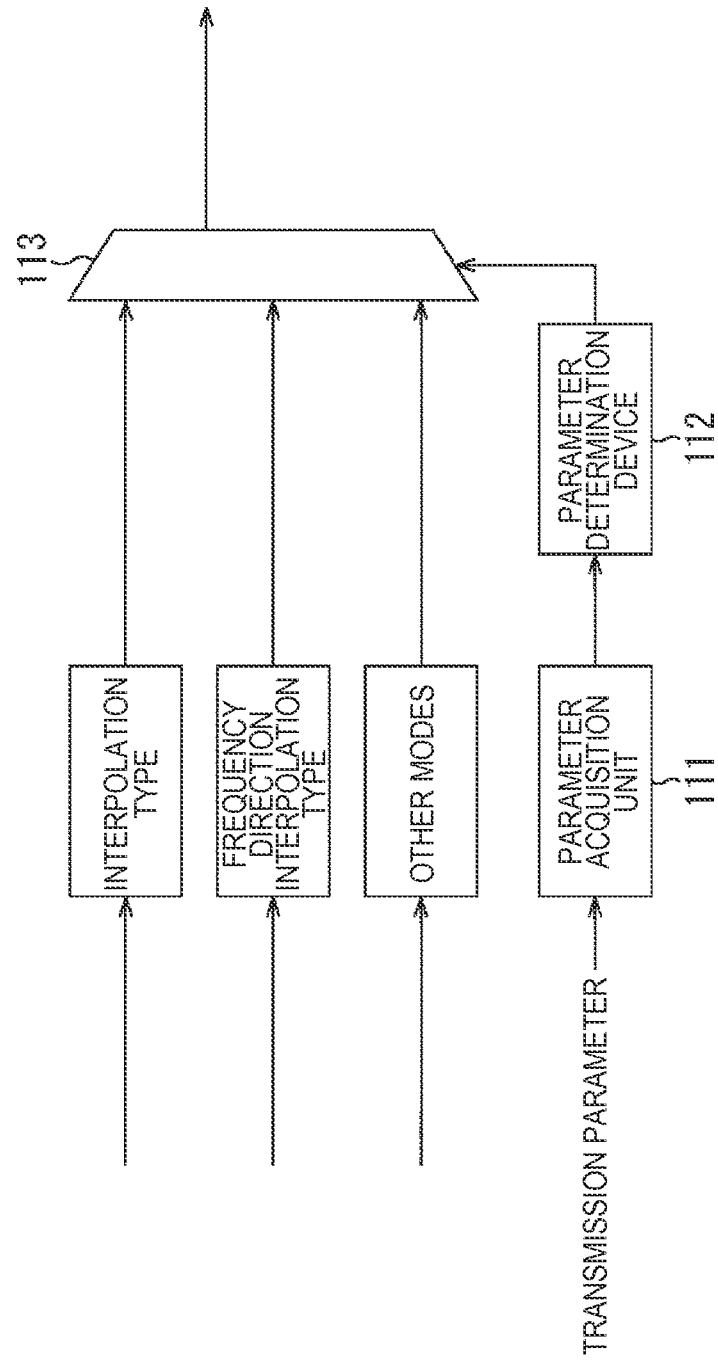
FIG. 3 is a diagram illustrating a selection method of an equalization mode of the present technology.

More specifically, in the equalization unit 106 as shown in FIG. 3, a transmission parameter is acquired by a parameter acquisition unit 111 and an appropriate equalization mode is determined from a plurality of equalization modes by a parameter determination device 112 based on the transmission parameter. Then, a selector 113 selects the appropriate equalization mode from the plurality of equalization modes following the determination result by the parameter determination device 112.

Here, details of the transmission parameter will be described with reference to FIG. 4.

In the DVB-T2 standard, a frame called a T2 frame is defined and data is transmitted in units of T2 frames. The T2 frame also contains, in addition to data, information necessary for processing such as demodulation of an OFDM signal and the parameter acquisition unit 111 acquires the transmission parameter therefrom.

The transmission parameter contains, for example, parameters below. That is, the transmission parameter contains a first parameter indicating whether the communication mode is SISO or MISO, a second parameter indicating the presence/absence of FEF, a third parameter indicating an arrangement pattern of a pilot signal as a known signal, a fourth parameter indicating the frame length of a T2 frame, and other parameters about an OFDM signal.

Single input single output (SISO) is a communication mode in which antennas are used in a one-to-one relationship. On the other hand, multiple input single output (MISO) is a communication mode in which signals transmitted by a plurality of antennas are received by a single antenna.

Future extension frame (FEF) is a frame having a different structure from that of the T2 frame. That is, in the DVB-T2 standard, T2 frame signals and FEF signals are multiplexed and transmitted.

When the above transmission parameter (FIG. 4) is acquired by the parameter acquisition unit 111, the parameter determination device 112 selects the interpolation type mode, the frequency direction interpolation type mode, or other equalization modes as the equalization mode in accordance with the transmission parameter. Here, concrete processing content of, among modes of the equalization process performed by the equalization unit 106, the interpolation type mode and the frequency direction interpolation type mode will be described with reference to FIGS. 5 and 6.

(Interpolation Type Process)

Figure 5:
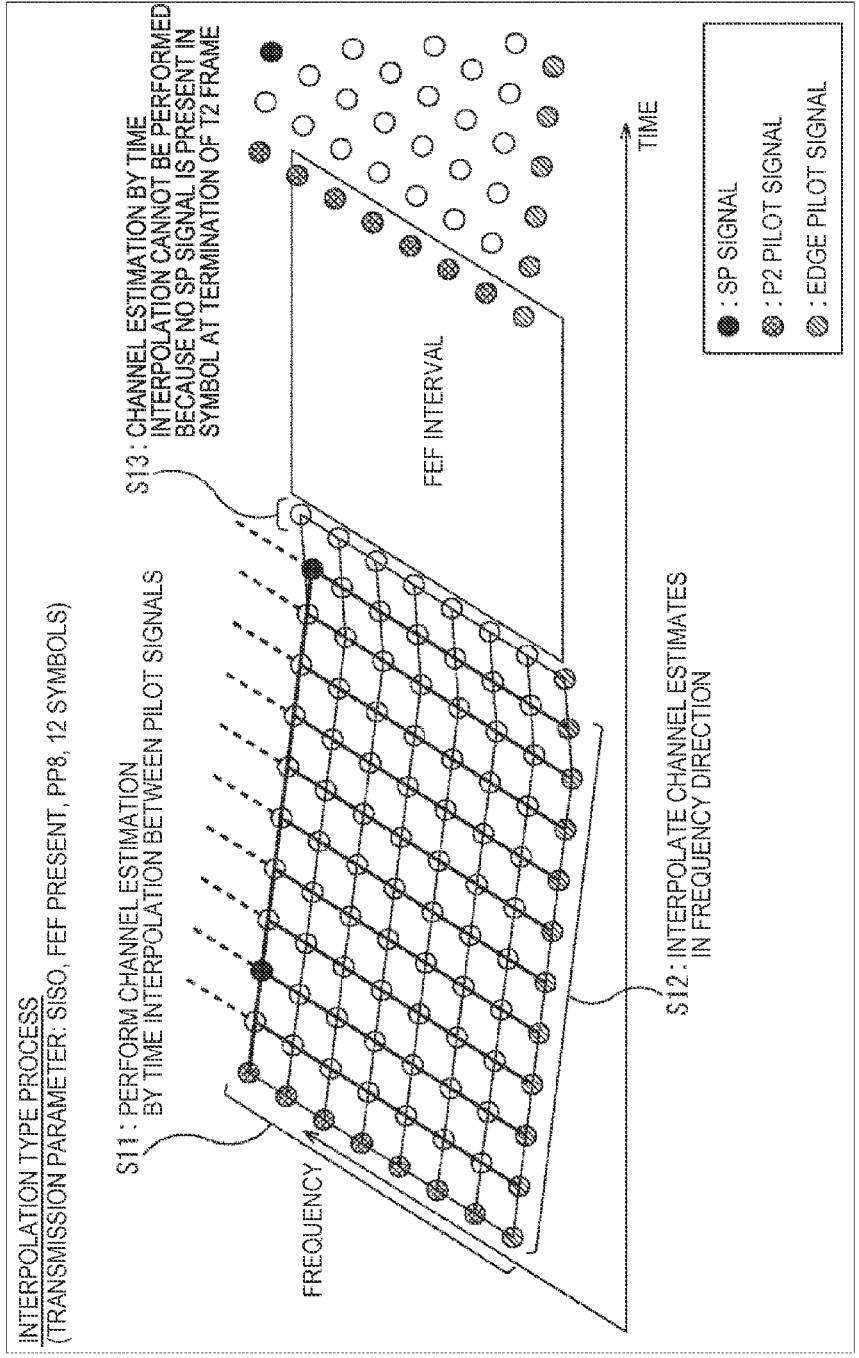
FIG. 5 is a diagram showing a concrete example of an interpolation type process.

First, the equalization process in interpolation type mode (hereinafter, called the interpolation type process) will be described. FIG. 5 shows an example of the interpolation type process when "SISO" is specified as the first parameter, "FEF present" is specified as the second parameter, "PP8" is specified as the third parameter, and "12 symbols" is specified as the fourth parameter.

In FIG. 5, the horizontal direction represents the time and the vertical direction represents the frequency. Also, one circle represents one symbol constituting an OFDM signal and a plurality of symbols is collected to form a T2 frame.

In the OFDM mode, a pilot signal having a predetermined amplitude and a predetermined phase is discretely inserted into symbols in the time direction or frequency direction on the transmitting side and characteristics of the transmission line (channel) are determined based on the amplitude and phase of the pilot signal on the receiving side to equalize an OFDM signal based on the characteristics of the channel. A pilot signal used to estimate characteristics of a channel as described above is called a scattered pilot (SP) signal.

A P2 pilot signal is a pilot signal contained in symbols of P2. P2 is a preamble signal in which information necessary for processing such as demodulation of an OFDM signal is contained. An edge pilot signal is a pilot signal arranged on both ends of the frequency direction.

In the interpolation type process, channel estimation is first performed by time interpolation between pilot signals (S11). Then, the estimated channel estimate is interpolated in the frequency direction (S12). Because FEF signals are multiplexed into an OFDM signal, an interval of FEF is present between T2 frames. In the example of FIG. 5, no SP signal is present in the symbol at the termination of a T2 frame arranged near the boundary between the T2 frame and FEF and therefore, it is difficult to perform channel estimation by time interpolation (S13).

That is, when the interpolation type process is performed, if no SP signal is present in the symbol at the termination of a T2 frame, it is difficult to perform channel estimation by time interpolation and thus, an appropriate equalization process is not performed. In the example of FIG. 5, therefore, it is considered not to be suitable to select the interpolation type mode as the equalization mode.

(Frequency Direction Interpolation Type Process)

Figure 6:
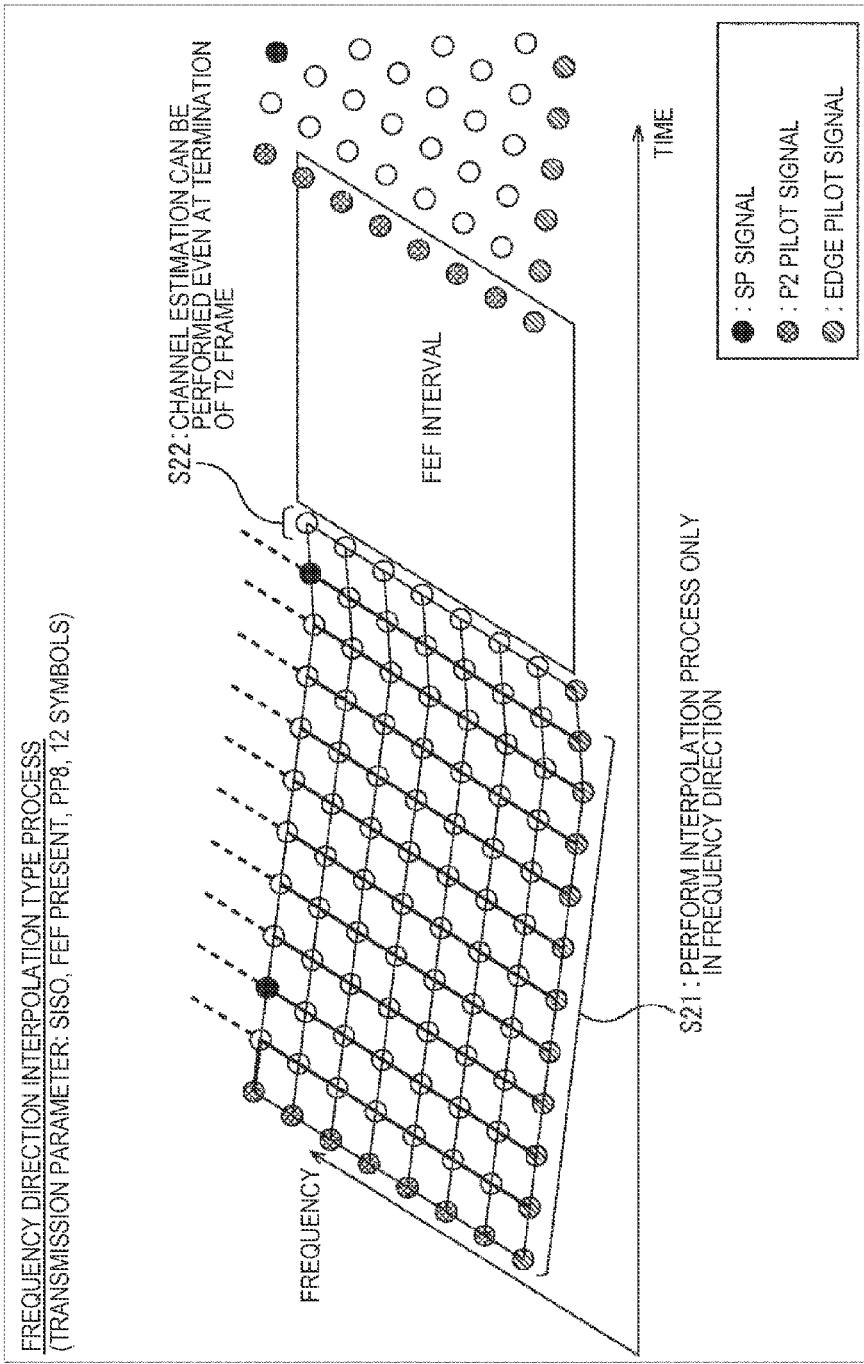
FIG. 6 is a diagram showing a concrete example of a frequency direction interpolation type process.

Next, the equalization process in frequency direction interpolation type mode (hereinafter, called the frequency direction interpolation type process) will be described. FIG. 6 shows an example of the frequency direction interpolation type process when "SISO" is specified as the first parameter, "FEF present" is specified as the second parameter, "PP8" is specified as the third parameter, and "12 symbols" is specified as the fourth parameter.

In FIG. 6, like in FIG. 5, the horizontal direction represents the time and the vertical direction represents the frequency and an SP signal is discretely inserted into a T2 frame formed by collecting a plurality of symbols. The arrangement of pilot signals in FIG. 6 is the same as in FIG. 5.

In the frequency direction interpolation type process, channel estimation by time interpolation is not performed and an interpolation process is performed only in the frequency direction (S21). Thus, when no SP signal is present in the symbol at the termination of a T2 frame, channel estimation can still be performed at the termination of a T2 frame (S22).

That is, in the frequency direction interpolation type process, even if no SP signal is present in the symbol at the termination of a T2 frame, an appropriate equalization process is performed by performing the interpolation process only in the frequency direction. In the example of FIG. 6, therefore, it considered to be suitable to select the frequency direction interpolation type mode as the equalization mode.

In the arrangement of pilot signals shown in FIGS. 5 and 6, as described above, it is suitable to select, instead of the interpolation type mode, the frequency direction interpolation type mode as the equalization mode and this can be determined by using the transmission parameter. That is, in this example, while "SISO", "FEF present", "PP8", and "12 symbols" are specified as the first to fourth parameters respectively, for example, if "FEF present" is specified as the second parameter and an interval of FEF is present, the parameter determination device 112 selects the frequency direction interpolation type mode as the equalization mode.

By selecting the equalization mode by using the transmission parameter in this manner, even if pilot signals are arranged as shown in FIGS. 5 and 6 and no SP signal is present in the symbol at the termination of a T2 frame, the frequency direction interpolation type mode is selected and therefore, channel estimation can be performed even at the termination of a T2 frame. In addition, if the equalization mode is selected using the transmission parameter, the equalization mode can be determined based on only the transmission parameter without monitoring reception states of the equalization process in each equalization mode and therefore, the equalization process in appropriate equalization mode can be performed without a determination delay or an erroneous determination.

(Equalization Mode Selection Process)

Next, an equalization mode selection process will be described with reference to the flow chart in FIG. 7.

In step S51, the parameter acquisition unit 111 acquires the transmission parameter. The transmission parameter is acquired from a T2 frame, but the transmission parameter acquired in predetermined timing may be held and used.

In step S52, the parameter determination device 112 determines whether the parameter satisfies requirements of the interpolation type mode based on the transmission parameter acquired by the parameter acquisition unit 111. If, for example, "FEF absent" is specified as the second parameter, the parameter determination device 112 determines that requirements of the interpolation type mode are satisfied.

If, in step S52, requirements of the interpolation type mode are determined to be satisfied, the processing proceeds to step S53. In step S53, the selector 113 selects the interpolation type mode as the equalization mode. Accordingly, the interpolation type process is performed by the equalization unit 106.

If, in step S52, requirements of the interpolation type mode are determined not to be satisfied, the processing proceeds to step S54.

In step S54, the parameter determination device 112 determines whether the parameter satisfies requirements of the frequency direction interpolation type mode based on the transmission parameter acquired by the parameter acquisition unit 111. If, for example, "FEF present" is specified as the second parameter, the parameter determination device 112 determines that requirements of the frequency direction interpolation type mode are satisfied.

If, in step S54, requirements of the frequency direction interpolation type mode are determined to be satisfied, the processing proceeds to step S55. In step S55, the selector 113 selects the frequency direction interpolation type mode as the equalization mode. Accordingly, the frequency direction interpolation type process is performed by the equalization unit 106.

If, in step S54, requirements of the frequency direction interpolation type mode are determined not to be satisfied, the processing proceeds to step S56. In step S56, the selector 113 selects one of other modes as the equalization mode. Accordingly, the equalization process in accordance with the selected other mode is performed by the equalization unit 106.

With the equalization mode in accordance with the transmission parameter being selected by the parameter acquisition unit 111 to the selector 113, as described above, the equalization process according to the selected equalization mode is performed by the equalization unit 106.

Figure 7:
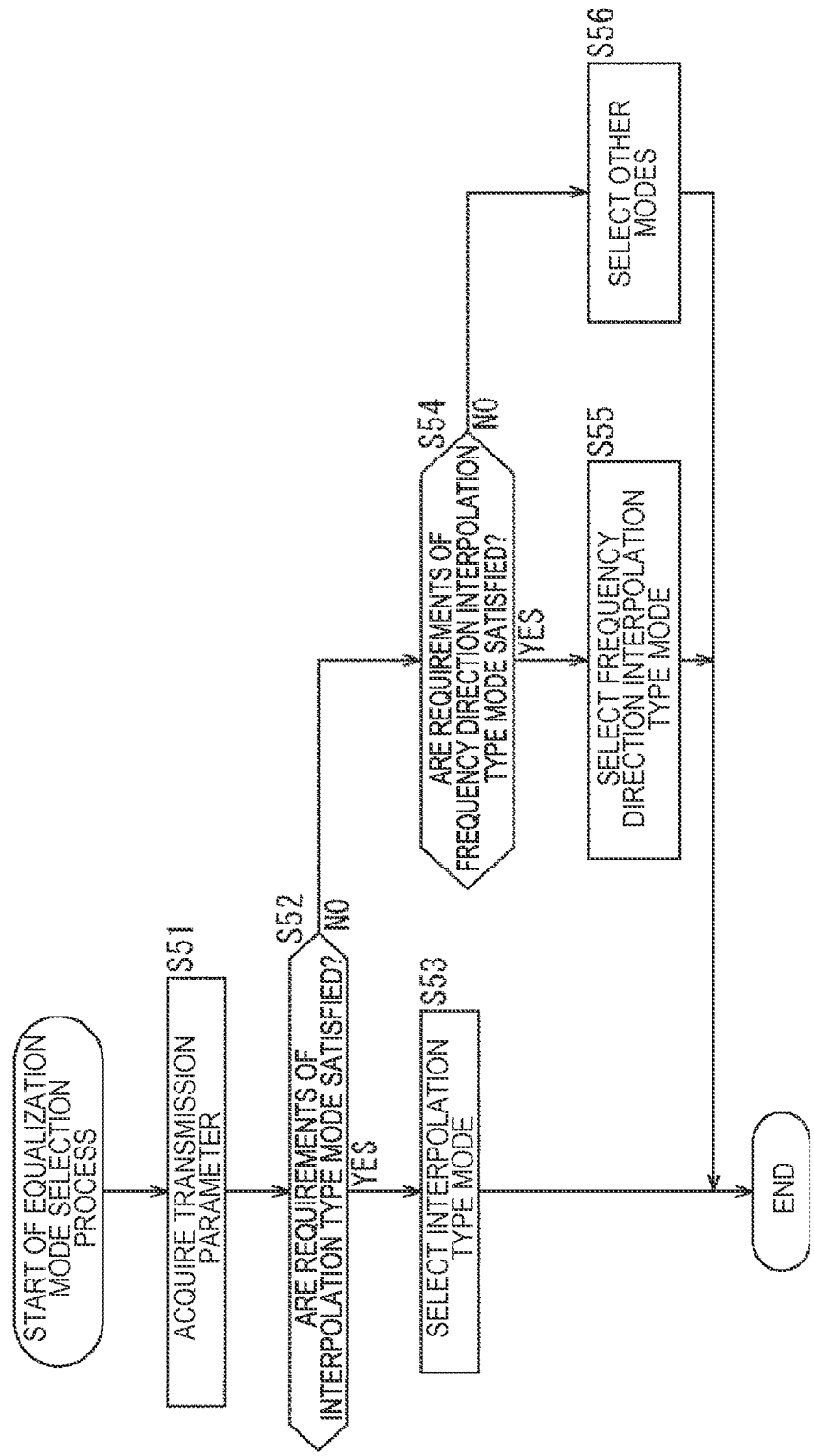
FIG. 7 is a flow chart illustrating an equalization mode selection process.

In the equalization mode selection process in FIG. 7, requirements of the interpolation type mode and requirements of the frequency direction interpolation type mode described above are only examples and each parameter or a combination of such parameters contained in the transmission parameter can be set as requirements. In addition, requirements for the selection of other modes can also be specified.

In the foregoing, the equalization mode selection process has been described.

[Selection Method of the Noise Estimation Mode]

In the description above, an example of selecting the equalization mode using the transmission parameter has been described, but the demodulation mode other than the equalization mode, for example, the noise estimation mode can be selected. Thus, next, the selection method of the noise estimation mode will be described.

Modes of the noise estimation process include the pilot estimation mode, the fixed value mode, and other noise estimation modes. The pilot estimation mode is a mode in which the amount of noise for each carrier is estimated by using a pilot signal. The fixed value mode is a mode in which a pre-defined fixed value is used.

Figure 8:
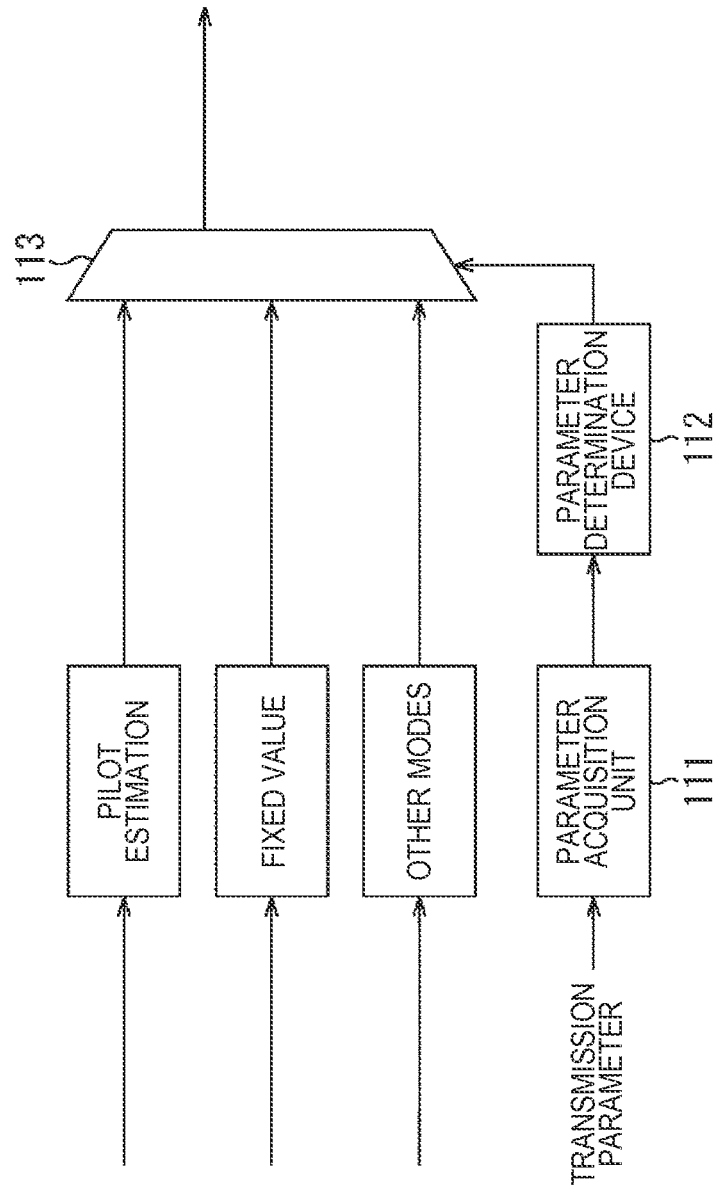
FIG. 8 is a diagram illustrating the selection method of a noise estimation mode of the present technology.

As shown in FIG. 8, a transmission parameter is acquired by the parameter acquisition unit 111 and an appropriate noise estimation mode is selected from a plurality of noise estimation modes by the parameter determination device 112 based on the transmission parameter. Then, the selector 113 selects the appropriate noise estimation mode from the plurality of noise estimation modes following the determination result by the parameter determination device 112.

(Pilot Estimation Process)

Figure 9:
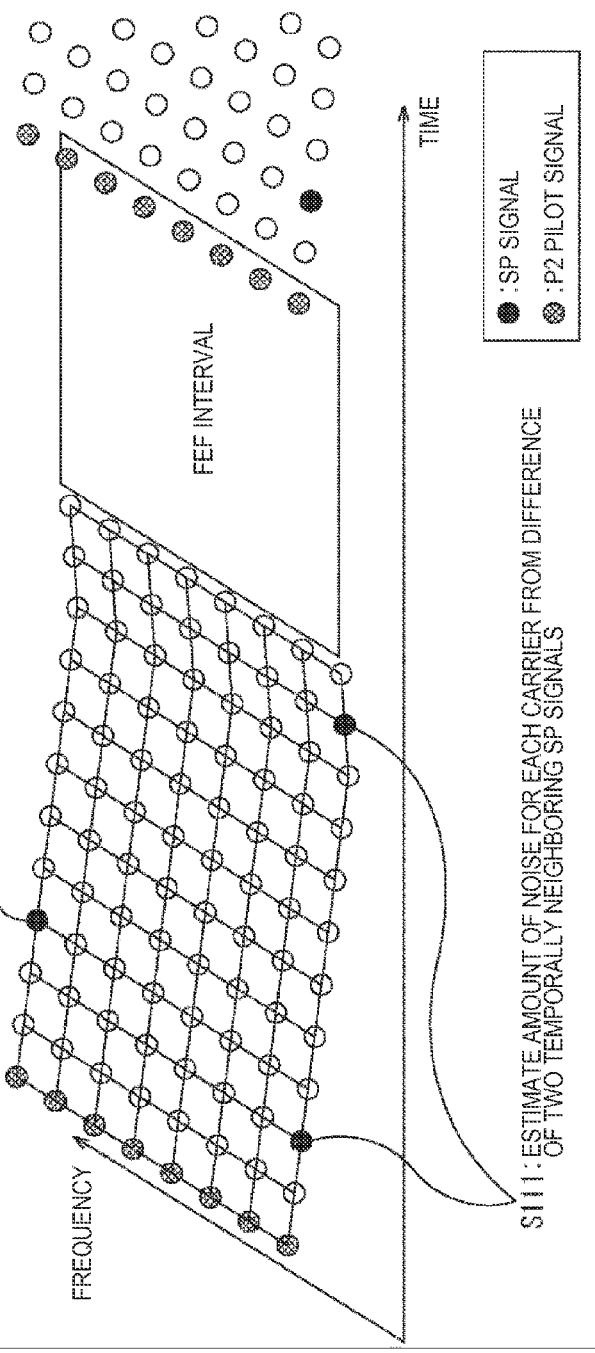
FIG. 9 is a diagram showing a concrete example of a noise estimation process.

FIG. 9 shows an example of the noise estimation process in pilot estimation mode (hereinafter, called the pilot estimation process) when "SISO" is specified as the first parameter, "FEF present" is specified as the second parameter, "PP8" is specified as the third parameter, and "12 symbols" is specified as the fourth parameter.

In FIG. 9, the horizontal direction represents the time and the vertical direction represents the frequency and an SP signal is discretely inserted into a T2 frame formed by collecting a plurality of symbols.

In the pilot estimation process, the amount of noise for each carrier is estimated from a difference between two temporally neighboring SP signals (S111). Thus, if there is a carrier in which only one SP signal is present in a T2 frame, it becomes impossible to estimate the amount of noise in pilot estimation process (S112).

That is, when pilot estimation process is performed, if there is a carrier in which only one SP signal is present in a T2 frame, it becomes impossible to estimate the amount of noise and an appropriate noise estimation process will not be performed. Therefore, in the example of FIG. 9, it considered not to be suitable to select the pilot estimation mode as the noise estimation mode. In this case, it is suitable to select the fixed value mode as the noise estimation mode to perform processing using a pre-defined fixed value (hereinafter, called the fixed value process).

Therefore, in the arrangement of pilot signals shown in FIG. 9, it is suitable to select, instead of the pilot estimation mode, the fixed value mode as the noise estimation mode. That is, in this case, "SISO", "FEF present", "PP8", and "12 symbols" are each specified and the parameter determination device 112 is made to select the fixed value mode as the noise estimation mode in accordance with the transmission parameter.

More specifically, if "FEF present" is specified as the second parameter and an interval of FEF is present and also "12 symbols" specified as the fourth parameter is equal to or less than a threshold, it is highly probable that there is a carrier in which only one SP signal is present inside a T2 frame and the parameter determination device 112 selects the fixed value mode as the noise estimation mode.

Even if pilot signals are arranged as shown in FIG. 9 and there is a carrier in which only one SP signal is present in a T2 frame, the fixed value mode will be selected to perform the noise estimation process. In addition, if the noise estimation mode is selected using the transmission parameter, the noise estimation mode can be determined based on only the transmission parameter without monitoring reception states of the noise estimation process in each noise estimation mode and therefore, the noise estimation process in appropriate noise estimation mode can be performed without a determination delay or an erroneous determination.

(Noise Estimation Mode Selection Process)

Next, a noise estimation mode selection process will be described with reference to the flow chart in FIG. 10.

In step S151, like step S51 in FIG. 7, the parameter acquisition unit 111 acquires the transmission parameter.

In step S152, the parameter determination device 112 determines whether the parameter satisfies requirements of the pilot estimation mode based on the transmission parameter acquired by the parameter acquisition unit 111. If, for example, "FEF absent" is specified as the second parameter or the frame length of a T2 frame specified as the fourth parameter exceeds a predetermined threshold, the parameter determination device 112 determines that requirements of the pilot estimation mode are satisfied.

If, in step S152, requirements of the pilot estimation mode are determined to be satisfied, the processing proceeds to step S153. In step S153, the selector 113 selects the pilot estimation mode as the noise estimation mode. Accordingly, the pilot estimation process will be performed.

If, in step S152, requirements of the pilot estimation mode are determined not to be satisfied, the processing proceeds to step S154.

In step S154, the parameter determination device 112 determines whether the parameter satisfies requirements of the fixed value mode based on the transmission parameter acquired by the parameter acquisition unit 111. If, for example, "FEF present" is specified as the second parameter or the frame length of a T2 frame specified as the fourth parameter is equal to or less than a predetermined threshold, the parameter determination device 112 determines that requirements of the fixed value mode are satisfied.

If, in step S154, requirements of the fixed value mode are determined to be satisfied, the processing proceeds to step S155. In step S155, the selector 113 selects the fixed value mode as the noise estimation mode. Accordingly, the fixed value process will be performed.

If, in step S154, requirements of the fixed value mode are determined not to be satisfied, the processing proceeds to step S156. In step S156, the selector 113 selects one of other modes as the noise estimation mode. Accordingly, the noise estimation process in accordance with the selected other mode is performed.

With the noise estimation mode in accordance with the transmission parameter being selected by the parameter acquisition unit 111 to the selector 113, as described above, the noise estimation process according to the selected noise estimation mode is performed.

Figure 10:
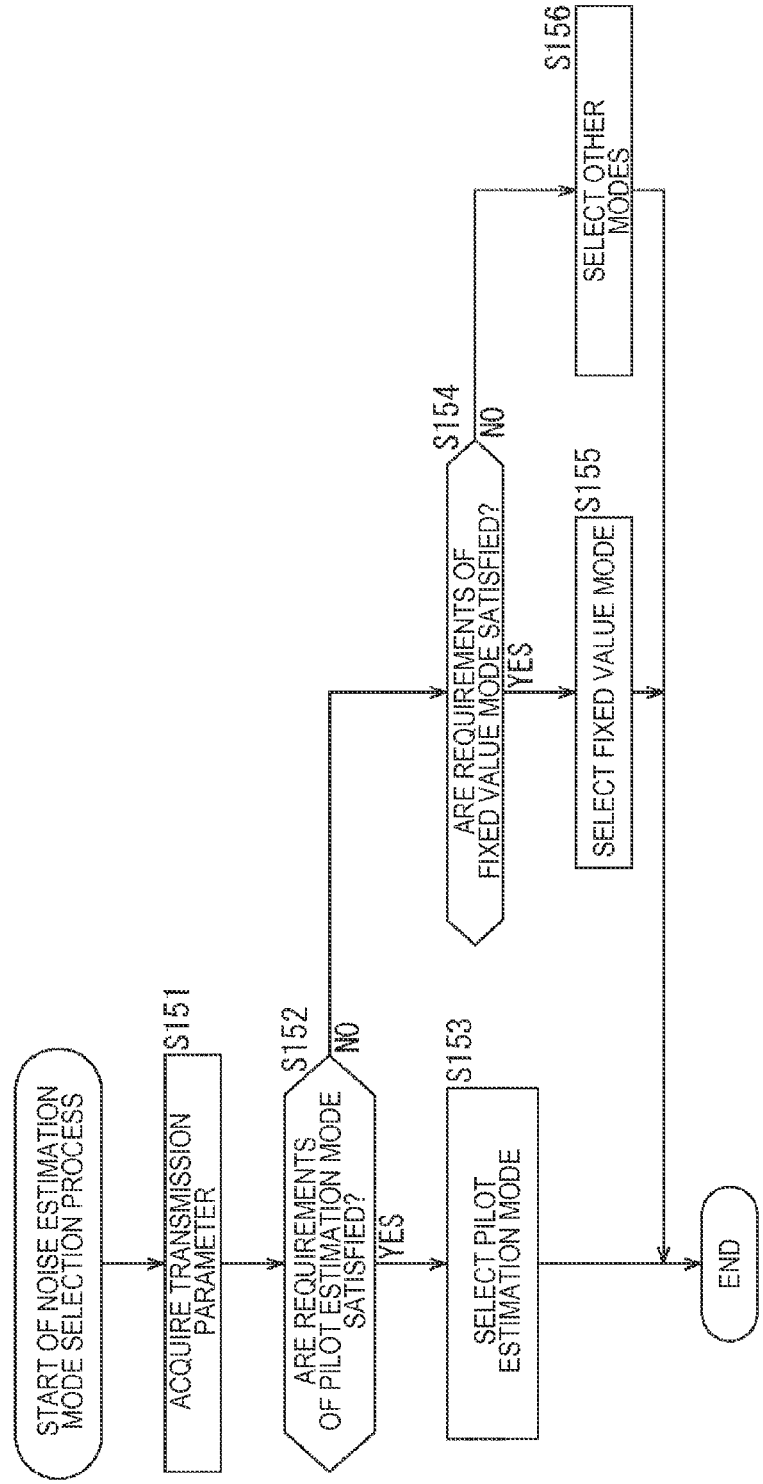
FIG. 10 is a flow chart illustrating a noise estimation mode selection process.

In the noise estimation mode selection process in FIG. 10, requirements of the pilot estimation mode and requirements of the fixed value mode described above are only examples and each parameter or a combination of such parameters contained in the transmission parameter can be set as requirements. In addition, requirements for the selection of other modes can also be specified.

In the foregoing, the noise estimation mode selection process has been described.

[Selection Method of the Equalization Mode in Accordance with the Symbol Position]

As shown in FIG. 11, the equalization mode may be selected in accordance with the symbol position specified by the transmission parameter.

More specifically, when one T2 frame is configured by N (1, 2, . . . , N) symbols in the example of FIG. 11, the interpolation type mode is selected for the first to (N−2)-th symbols as the equalization mode and the frequency direction interpolation type mode is selected for the (N−1)-th and N-th symbols as the equalization mode.

(Equalization Process in Accordance with the Symbol Position)

FIG. 12 shows an example of the equalization process in accordance with the symbol position when "SISO" is specified as the first parameter, "FEF present" is specified as the second parameter, "PP8" is specified as the third parameter, and "12 symbols" is specified as the fourth parameter.

In FIG. 12, the horizontal direction represents the time and the vertical direction represents the frequency and an SP signal is discretely inserted into a T2 frame formed by collecting a plurality of symbols.

In the equalization process in accordance with the symbol position, time interpolation is performed between pilot signals in accordance with the symbol position specified by the transmission parameter to perform channel estimation (S211). Also in accordance with the symbol position specified by the transmission parameter, the frequency direction interpolation type process is performed only at the termination of the T2 frame (S212).

That is, in the example of FIG. 12, "PP8" is specified as the third parameter and "12 symbols" is specified as the fourth parameter and therefore, the frame length of the T2 frame is 12 symbols and an SP signal is inserted thereinto in an arrangement pattern defined by "PP8". Among symbol positions defined by these parameters, the interpolation type process is made to be performed for the first to tenth symbol positions and the frequency direction interpolation type process is made to be performed for the 11-th and 12-th symbol positions.

In the equalization process in accordance with the symbol position, as described above, even if no SP signal is present in the symbol at the termination of a T2 frame, the frequency direction interpolation type process is performed only at the termination of a T2 frame in accordance with the symbol position specified by the transmission parameter and otherwise, the interpolation type process is performed. Accordingly, an appropriate equalization process will be performed for each symbol position.

In the examples of FIGS. 11 and 12, the equalization mode is described as an example of the demodulation mode, but the demodulation mode is not limited to such an example and the noise estimation mode and other demodulation modes can similarly be selected in accordance with the symbol position specified by the transmission parameter.

The foregoing can be summarized as shown in FIG. 13. That is, in the reception device 100, the equalization mode, the noise estimation mode, or other demodulation modes will be selected as the demodulation mode in accordance with each parameter or a combination of such parameters contained in a transmission parameter.

Then, as the equalization mode, the interpolation type mode, the frequency direction interpolation type mode, or other equalization modes will be selected and as the noise estimation mode, the pilot estimation mode, the fixed value mode, or other noise estimation modes will be selected.

In the reception device 100, as described above, the demodulation process can be performed in appropriate demodulation mode by switching the demodulation mode using only the transmission parameter. As a result, a determination delay or an erroneous determination caused by determining the demodulation mode in accordance with the reception state does not arise and therefore, degradation of performance of demodulation can be prevented.

In addition, appropriate demodulation control can be exercised without using a complex determination device by switching the demodulation mode using the transmission parameter.

[Modification]

FIG. 14 is a diagram illustrating another example of the selection method of the equalization mode.

In the equalization unit 106, as shown in FIG. 14, a transmission parameter is acquired by the parameter acquisition unit 111 and an effective equalization mode is determined from a plurality of equalization modes by the parameter determination device 112 based on the transmission parameter. Then, if, in the determination, for example, the frequency direction interpolation type mode and other modes other than the interpolation type mode are determined to be effective equalization modes, the equalization process in frequency direction interpolation type mode or other modes is performed and the reception state thereof is determined by a reception state determination device 121. Then, the frequency direction interpolation type mode or other modes will be selected by a selector 122 in accordance with the determination result by the reception state determination device 121.

In the equalization unit 106, as described above, an appropriate equalization mode can be selected by combining the determination result by the parameter determination device 112 and the determination result by the reception state determination device 121. In this case, after equalization modes are narrowed down according to the determination result by the parameter determination device 112, an appropriate equalization mode is selected according to the determination result by the reception state determination device 121 and therefore, when compared with a case in which only the determination result by the reception state determination device 121 is used, the number of comparison of equalization modes can be reduced. Accordingly, the scale of operation can be decreased and erroneous determinations can be reduced.

In the example of FIG. 14, the equalization mode is described as an example of the demodulation mode, but the demodulation mode is not limited to such an example and an appropriate demodulation mode can similarly be selected by combining the determination result by the parameter determination device 112 and the determination result by the reception state determination device 121 also for the noise estimation mode and other demodulation modes.

[Configuration Example of Computer to which Present Technology is Applied]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 15 is a block diagram showing a hardware configuration example of a computer that performs the above-described series of processing using a program.

In the computer 200, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a recording unit 208, a communication unit 209, and a drive 210 are connected to the input/output interface 205.

The input unit 206 is configured from a keyboard, a mouse, a microphone or the like. The output unit 207 is configured from a display, a speaker or the like. The recording unit 208 is configured from a hard disk, a non-volatile memory or the like. The communication unit 209 is configured from a network interface or the like. The drive 210 drives a removable medium 211 such as a magnetic disk, an optical disk, a magneto-optical disk, a semiconductor memory or the like.

In the computer 200 configured as described above, the CPU 201 loads a program that is stored, for example, in the recording unit 208 onto the RAM 203 via the input/output interface 205 and the bus 204, and executes the program. Thus, the above-described series of processing is performed.

Programs to be executed by the computer 200 (the CPU 201) are provided being recorded in the removable medium 211 which is a packaged medium or the like. Also, programs may be provided via a wired or wireless transmission medium, such as a local area network, the Internet or digital satellite broadcasting.

In the computer 200, by loading the removable medium 211 into the drive 210, the program can be installed into the recording unit 208 via the input/output interface 205. It is also possible to receive the program from a wired or wireless transfer medium using the communication unit 209 and install the program into the recording unit 208. As another alternative, the program can be installed in advance into the ROM 202 or the recording unit 208.

It should be noted that the program executed by a computer 200 may be a program that is processed in time series according to the sequence described in this specification or a program that is processed in parallel or at necessary timing such as upon calling.

Here, in the present specification, processing steps that describe the program causing the computer 200 to execute various processes may not necessarily be processed in time series in the order prescribed as a flowchart, but include processes (for example, parallel processes or processes by objects) performed in parallel or individually.

The program may be a program executed by a single computer or may be a program executed in a distribution manner by a plurality of computers. The program may be transmitted remotely to a computer to be executed.

An embodiment of the disclosure is not limited to the embodiments described above, and various changes and modifications may be made without departing from the scope of the disclosure.

Additionally, the present technology may also be configured as below.

(1)

A reception device including:

a reception unit configured to receive an OFDM (Orthogonal Frequency Division Multiplexing) signal;

an acquisition unit configured to acquire a transmission parameter concerning the OFDM signal contained in the OFDM signal; and a selection unit configured to select a demodulation mode of the OFDM signal in accordance with the acquired transmission parameter.

(2)

The reception device according to (1), wherein the transmission parameter contains at least a first parameter indicating that a communication mode is SISO (Single Input Single Output) or MISO (Multiple Input Single Output), a second parameter indicating presence/absence of a second frame having a different structure from a first frame as a unit of transmitting data in a predetermined standard, a third parameter indicating an arrangement of pilot signals, or a fourth parameter indicating a frame length of the first frame, and wherein the selection unit selects the demodulation mode in accordance with each parameter or a combination of the parameters.

(3)

The reception device according to (1) or (2), wherein the selection unit selects an equalization mode as the demodulation mode.

(4)

The reception device according to (3), wherein the equalization mode is an interpolation type mode in which frequency direction interpolation of a channel estimate estimated by time interpolation between the pilot signals is performed or a frequency direction interpolation type mode in which interpolation is performed only in a frequency direction, and wherein the selection unit selects the frequency direction interpolation type mode when the second parameter indicates that the second frame is present.

(5) The reception device according to (1) or (2),
wherein the selection unit selects a noise estimation mode as the demodulation mode.

(6) The reception device according to (5),
wherein the noise estimation mode is a pilot estimation mode in which the pilot signals are used or a fixed value mode in which a pre-defined fixed value is used, and
wherein the selection unit selects the fixed value mode when the second parameter indicates that the second frame is present and the frame length indicated by the fourth parameter is equal to or less than a predetermined threshold.

(7) The reception device according to (1) or (2),
wherein the selection unit selects the demodulation mode in accordance with a symbol position defined by the transmission parameter.

(8) The reception device according to (7),
wherein the selection unit selects an equalization mode as the demodulation mode.

(9) The reception device according to (8),
wherein the equalization mode is an interpolation type mode in which frequency direction interpolation of a channel estimate estimated by time interpolation between the pilot signals is performed or a frequency direction interpolation type mode in which interpolation is performed only in a frequency direction, and
wherein the selection unit selects the interpolation type mode for the symbol position other than at a termination of the first frame and selects the frequency direction interpolation type mode for the symbol position at the termination of the first frame.

(10) The reception device according to (7),
wherein the selection unit selects a noise estimation mode as the demodulation mode.

(11) A reception method of a reception device, the reception method including, by the reception device:
a step of receiving an OFDM signal;
a step of acquiring a transmission parameter concerning the OFDM signal contained in the OFDM signal; and
a step of selecting a demodulation mode of the OFDM signal in accordance with the acquired transmission parameter.

(12) A program for causing a computer to function as:
a reception unit configured to receive an OFDM signal;
an acquisition unit configured to acquire a transmission parameter concerning the OFDM signal contained in the OFDM signal; and
a selection unit configured to select a demodulation mode of the OFDM signal in accordance with the acquired transmission parameter.

REFERENCE SIGNS LIST 100 reception device
101 antenna
102 tuner
103 A/D converter
104 orthogonal demodulation unit
105 FFT operation unit
106 equalization unit
107 decoder
108 output unit
111 parameter acquisition unit
112 parameter determination device
113 selector
121 reception state determination device
122 selector
200 computer
201 CPU

The invention claimed is:

1. A reception device comprising:
a reception unit configured to receive an OFDM (Orthogonal Frequency Division Multiplexing) signal;
an acquisition unit configured to acquire a transmission parameter of the OFDM signal contained in the OFDM signal; and
a selection unit configured to select a demodulation mode of the OFDM signal in accordance with the acquired transmission parameter,
wherein,
the transmission parameter contains at least a first parameter indicating that a communication mode is SISO (Single Input Single Output) or MISO (Multiple Input Single Output), a second parameter indicating presence/absence of a second frame having a different structure from a first frame as a unit of transmitting data in a predetermined standard, a third parameter indicating an arrangement of pilot signals, or a fourth parameter indicating a frame length of the first frame,
the selection unit selects the demodulation mode in accordance with each parameter or a combination of the parameters,
the selection unit selects an equalization mode as the demodulation mode,
the equalization mode is an interpolation type mode in which frequency direction interpolation of a channel estimate estimated by time interpolation between the pilot signals is performed or a frequency direction interpolation type mode in which interpolation is performed only in a frequency direction, and
the selection unit selects the frequency direction interpolation type mode when the second parameter indicates that the second frame is present.

2. The reception device according to claim 1, wherein the selection unit selects a noise estimation mode as the demodulation mode.

3. The reception device according to claim 1, wherein the selection unit selects the demodulation mode in accordance with a symbol position defined by the transmission parameter.

4. The reception device according to claim 3, wherein the selection unit selects an equalization mode as the demodulation mode.

5. The reception device according to claim 3, wherein the selection unit selects a noise estimation mode as the demodulation mode.

6. A reception device comprising:
a reception unit configured to receive an OFDM (Orthogonal Frequency Division Multiplexing) signal;
an acquisition unit configured to acquire a transmission parameter of the OFDM signal contained in the OFDM signal; and
a selection unit configured to select a demodulation mode of the OFDM signal in accordance with the acquired transmission parameter, wherein,
the transmission parameter contains at least a first parameter indicating that a communication mode is SISO (Single Input Single Output) or MISO (Multiple Input Single Output), a second parameter indicating presence/absence of a second frame having a different structure from a first frame as a unit of transmitting data in a predetermined standard, a third parameter indicating an arrangement of pilot signals, or a fourth parameter indicating a frame length of the first frame,
the selection unit selects the demodulation mode in accordance with each parameter or a combination of the parameters,
the selection unit selects a noise estimation mode as the demodulation mode,
the noise estimation mode is a pilot estimation mode in which the pilot signals are used or a fixed value mode in which a pre-defined fixed value is used, and
the selection unit selects the fixed value mode when the second parameter indicates that the second frame is present and the frame length indicated by the fourth parameter is equal to or less than a predetermined threshold.

7. A reception device comprising:
a reception unit configured to receive an OFDM (Orthogonal Frequency Division Multiplexing) signal;
an acquisition unit configured to acquire a transmission parameter of the OFDM signal contained in the OFDM signal; and
a selection unit configured to select a demodulation mode of the OFDM signal in accordance with the acquired transmission parameter,
wherein
the transmission parameter contains at least a first parameter indicating that a communication mode is SISO (Single Input Single Output) or MISO (Multiple Input Single Output), a second parameter indicating presence/absence of a second frame having a different structure from a first frame as a unit of transmitting data in a predetermined standard, a third parameter indicating an arrangement of pilot signals, or a fourth parameter indicating a frame length of the first frame,
the selection unit selects the demodulation mode in accordance with each parameter or a combination of the parameters,
the selection unit selects the demodulation mode in accordance with a symbol position defined by the transmission parameter,
the selection unit selects an equalization mode as the demodulation mode, the equalization mode is an interpolation type mode in which frequency direction interpolation of a channel estimate estimated by time interpolation between the pilot signals is performed or a frequency direction interpolation type mode in which interpolation is performed only in a frequency direction, and
the selection unit selects the interpolation type mode for the symbol position other than at a termination of the first frame and selects the frequency direction interpolation type mode for the symbol position at the termination of the first frame.

8. A reception method of a reception device, the reception method comprising, by the reception device:
a step of receiving an OFDM (Orthogonal Frequency Division Multiplexing) signal;
a step of acquiring a transmission parameter concerning the OFDM signal contained in the OFDM signal; and
a step of selecting a demodulation mode of the OFDM signal in accordance with the acquired transmission parameter,
wherein,
the transmission parameter contains at least a first parameter indicating that a communication mode is SISO (Single Input Single Output) or MISO (Multiple Input Single Output), a second parameter indicating presence/absence of a second frame having a different structure from a first frame as a unit of transmitting data in a predetermined standard, a third parameter indicating an arrangement of pilot signals, or a fourth parameter indicating a frame length of the first frame,
the demodulation mode is selected in accordance with each parameter or a combination of the parameters,
an equalization mode is selected as the demodulation mode,
the equalization mode is an interpolation type mode in which frequency direction interpolation of a channel estimate estimated by time interpolation between the pilot signals is performed or a frequency direction interpolation type mode in which interpolation is performed only in a frequency direction, and
the selection unit selects the frequency direction interpolation type mode when the second parameter indicates that the second frame is present.

9. A non-transitory computer readable storage medium having stored thereon program instructions for causing a computer to function as:
a reception unit configured to receive an OFDM (Orthogonal Frequency Division Multiplexing) signal;
an acquisition unit configured to acquire a transmission parameter concerning the OFDM signal contained in the OFDM signal; and
a selection unit configured to select a demodulation mode of the OFDM signal in accordance with the acquired transmission parameter,.
wherein,
the transmission parameter contains at least a first parameter indicating that a communication mode is SISO (Single Input Single Output) or MISO (Multiple Input Single Output), a second parameter indicating presence/absence of a second frame having a different structure from a first frame as a unit of transmitting data in a predetermined standard, a third parameter indicating an arrangement of pilot signals, or a fourth parameter indicating a frame length of the first frame,
the selection unit selects the demodulation mode in accordance with each parameter or a combination of the parameters,
the selection unit selects an equalization mode as the demodulation mode,
the equalization mode is an interpolation type mode in which frequency direction interpolation of a channel estimate estimated by time interpolation between the pilot signals is performed or a frequency direction interpolation type mode in which interpolation is performed only in a frequency direction, and
the selection unit selects the frequency direction interpolation type mode when the second parameter indicates that the second frame is present.

* * * * *